(12) United States Patent
Nguyen-Dinh et al.

(10) Patent No.: US 9,138,793 B2
(45) Date of Patent: Sep. 22, 2015

(54) PROCESS AND APPARATUS TO RESTORE DISTORTED FEATURES ON GAS TURBINE VANES

(71) Applicant: CHROMALLOY GAS TURBINE LLC, Palm Beach Gardens, FL (US)

(72) Inventors: Xuan Nguyen-Dinh, Mexicali (MX); Roberto Flores Sandoval, Baja California (MX); Ben Blumanstock, Stuart, FL (US)

(73) Assignee: CHROMALLOY GAS TURBINE LLC, Palm Beach Gardens, FL (US)

( * ) Notice: Subject to any disclaimer, the term of this patent is extended or adjusted under 35 U.S.C. 154(b) by 13 days.

(21) Appl. No.: 14/208,489

(22) Filed: Mar. 13, 2014

(65) Prior Publication Data

US 2014/0259662 A1    Sep. 18, 2014

Related U.S. Application Data

(60) Provisional application No. 61/851,939, filed on Mar. 14, 2013.

(51) Int. Cl.
*B21D 3/10* (2006.01)
*B21D 3/16* (2006.01)
*F01D 9/04* (2006.01)
*F01D 25/28* (2006.01)
*B23P 6/00* (2006.01)

(52) U.S. Cl.
CPC ........ *B21D 3/16* (2013.01); *F01D 9/041* (2013.01); *F01D 25/285* (2013.01); *B21D 3/10* (2013.01); *B23P 6/002* (2013.01); *B23P 2700/13* (2013.01); *F01D 25/28* (2013.01); *F05D 2230/80* (2013.01); *Y10T 29/4975* (2015.01); *Y10T 29/49318* (2015.01); *Y10T 29/49327* (2015.01); *Y10T 29/49725* (2015.01); *Y10T 29/49748* (2015.01)

(58) Field of Classification Search
CPC ........ B23P 6/002; F05D 2230/80; B21D 3/10; B21D 3/16; F01D 25/28; F01D 25/285; Y10T 29/49318; Y10T 29/49327; Y10T 29/49748; Y10T 29/4975; Y10T 29/49725
USPC .................. 29/889.1, 889.3, 409.19, 402.21; 72/214, 414, 416, 388
See application file for complete search history.

(56) References Cited

U.S. PATENT DOCUMENTS

| | | | |
|---|---|---|---|
| 5,444,911 A | 8/1995 | Goodwater et al. | |
| 6,938,447 B2 * | 9/2005 | Fuse et al. | 72/21.5 |
| 6,959,572 B2 * | 11/2005 | Lawrence et al. | 72/31.03 |
| 7,730,756 B2 | 6/2010 | Gosling et al. | |
| 7,805,972 B2 * | 10/2010 | Prevey, III | 72/407 |
| 8,127,581 B2 * | 3/2012 | Davis et al. | 72/31.03 |
| 8,186,056 B2 | 5/2012 | Willis et al. | |
| 8,887,390 B2 * | 11/2014 | Gaul | 29/889.1 |
| 2009/0000102 A1 * | 1/2009 | Willis et al. | 29/402.21 |
| 2013/0142639 A1 * | 6/2013 | Zebec et al. | 415/208.1 |

OTHER PUBLICATIONS

International Search Report with Written Opinion dated Oct. 3, 2014 in Application No. PCT/US14/27574, 12 pages.

* cited by examiner

*Primary Examiner* — Jason L Vaughan
(74) *Attorney, Agent, or Firm* — Lathrop & Gage LLP

(57) ABSTRACT

A method and apparatus for restoring displaced features on a turbine vane segment for a gas turbine engine, such as a vane segment in a low pressure turbine, and more specifically, the inner shroud thereof relative to the outer shroud thereof to meet the original design position and dimensions.

12 Claims, 4 Drawing Sheets

US 9,138,793 B2

PROCESS AND APPARATUS TO RESTORE DISTORTED FEATURES ON GAS TURBINE VANES

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD

This invention disclosure provides a method and apparatus to restore the displaced features on a turbine vane segment for a gas turbine engine, such as a low pressure turbine vane, and more specifically, the inner shroud relative to the outer shroud of a vane segment.

BACKGROUND OF THE INVENTION

In advanced turbine engines, gas turbine parts in the hot gas path such as blades, vanes and outer air seals in the high pressure turbine and the low pressure turbine, are subjected to temperatures and loads that, over time, can distort the dimensions of these parts to the point that they deviate so substantially from the original equipment manufacturer's drawings and specifications that the parts are typically scrapped when the gas turbine engine is overhauled or repaired. In some cases, scrapping of the component and replacement with a new part may be driven by flight safety issues, but in other cases, the part is scrapped simply because there is no viable repair available.

An example of one such part is the stator vane segment 11 in the third stage of the low pressure turbine on the Pratt & Whitney PW4000 gas turbine engine, as shown in FIG. 1. Typically, a plurality of vanes 10 are clustered together to form a vane segment 11, of which there are a plurality in the set of third stage, low pressure turbine vanes for this particular engine. These particular vanes 10 are cast from a nickel-base alloy, such as Mar-M 247, an alloy well known in the art. They are installed in the engine by engaging by the forward outer shroud rail 12 and the aft ward outer shroud rail 14, as shown in FIG. 1, on the internal case rails of the low pressure turbine (not shown) of the engine. The inner shroud 16 includes an inner flange 18 which contains a bolt hole 20 that is used to bolt the vane segment 11 to an inner support (not shown) in the low pressure turbine. Due to thermal and aerodynamic loads, the inner shroud 16 may experience distortion such as displacement, or shifting, of the inner shroud 16, relative to the outer shroud 24, in the distortion direction 17, and elongation of the bolt hole 20 and a displacement of the center 22 of the bolt hole 20 in a distortion direction 17 relative to the outer vane shroud 24, which for the PW4000 would be clockwise from its original design location as viewed from a forward-looking-aft position, as shown in FIG. 1. This displacement of the center 22 of the bolt hole 20 is not isolated to one particular vane segment 11, in any engine set, as all vane segments 11 in a set may experience this type of displacement. The degree, or dimensional amount, of displacement is not constant from one vane segment 11 to another vane segment 11.

What is needed is a method and apparatus for restoring displaced features on a turbine vane segment for a gas turbine engine, such as a vane segment in a low pressure turbine, and more specifically, the inner shroud thereof relative to the outer shroud thereof to meet the original design position and dimensions.

BRIEF SUMMARY OF THE INVENTION

The present invention provides a method for restoring the inner shroud of a vane segment to its original design position and dimensions relative to the outer shroud of such vane segment.

The present invention further provides an apparatus for practicing the method for restoring the inner shroud of a vane segment to its original design position and dimensions relative to the outer shroud of such vane segment.

The present invention further provides a method for restoring the bolt hole in the inner shroud flange of a vane segment to its original design position and dimensions.

BRIEF DESCRIPTION OF THE SEVERAL VIEWS OF THE DRAWING

The present invention is described in detail below with reference to the attached drawing figures, wherein.

DETAILED DESCRIPTION OF THE INVENTION

Figure 1:
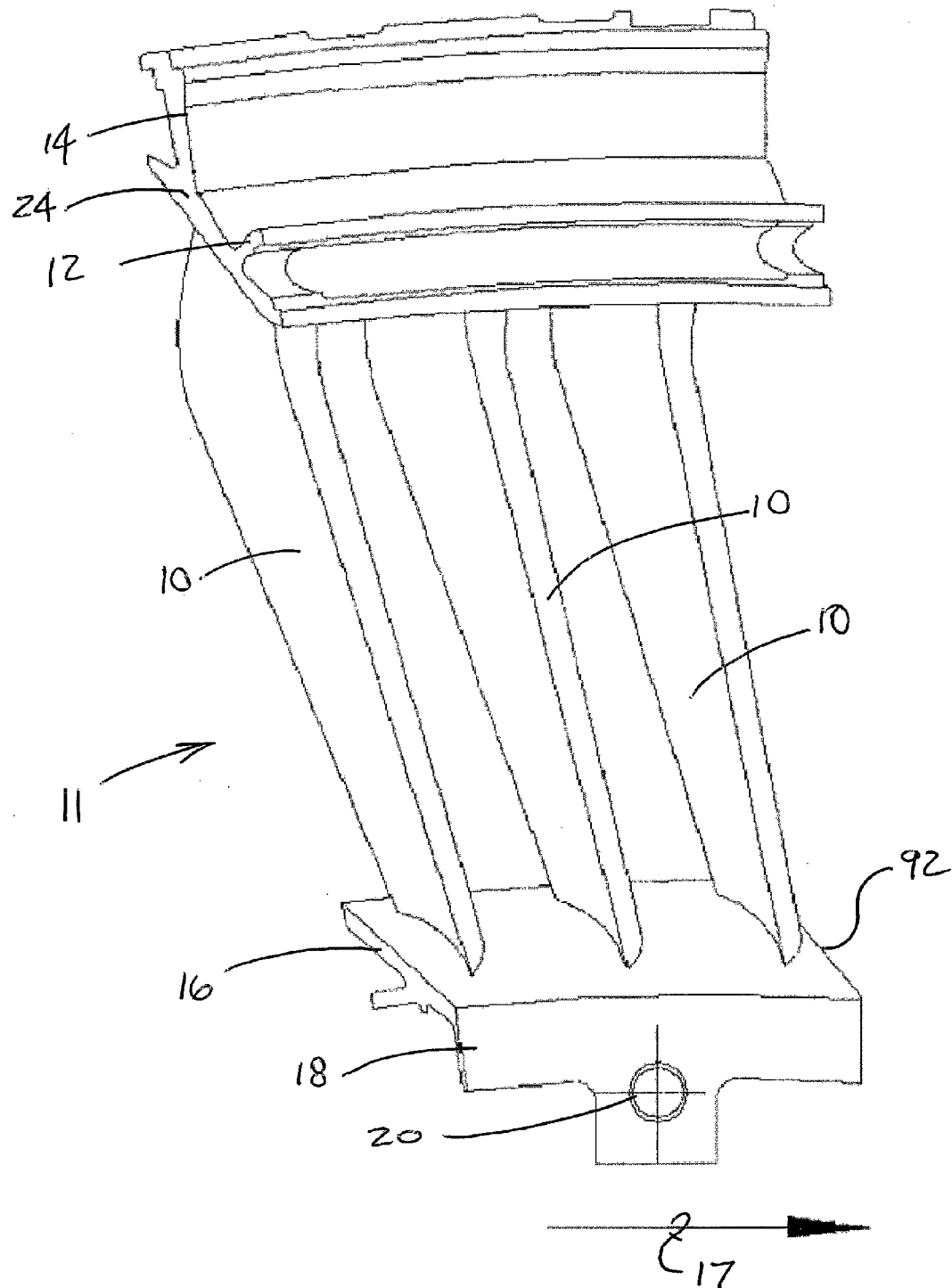
FIG. 1 is a forward-looking-aft view of a vane segment of the type which can be restored using the method and apparatus of the present invention, as viewed from the front of the gas turbine in which it is designed to operate.
Figure 2:
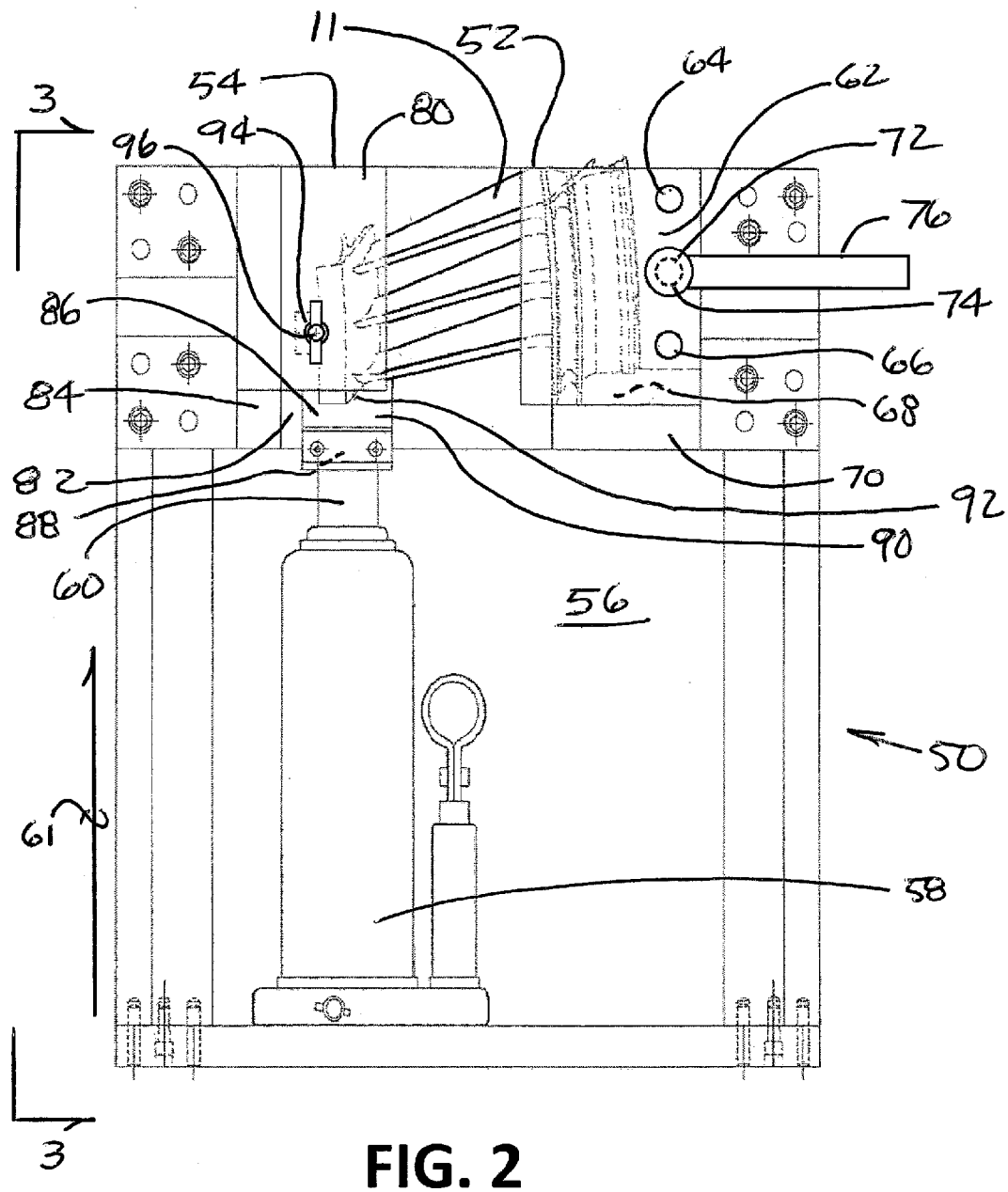
FIG. 2 is an elevation view of the apparatus of the present invention which is used to practice the method of the present invention.
Figure 3:
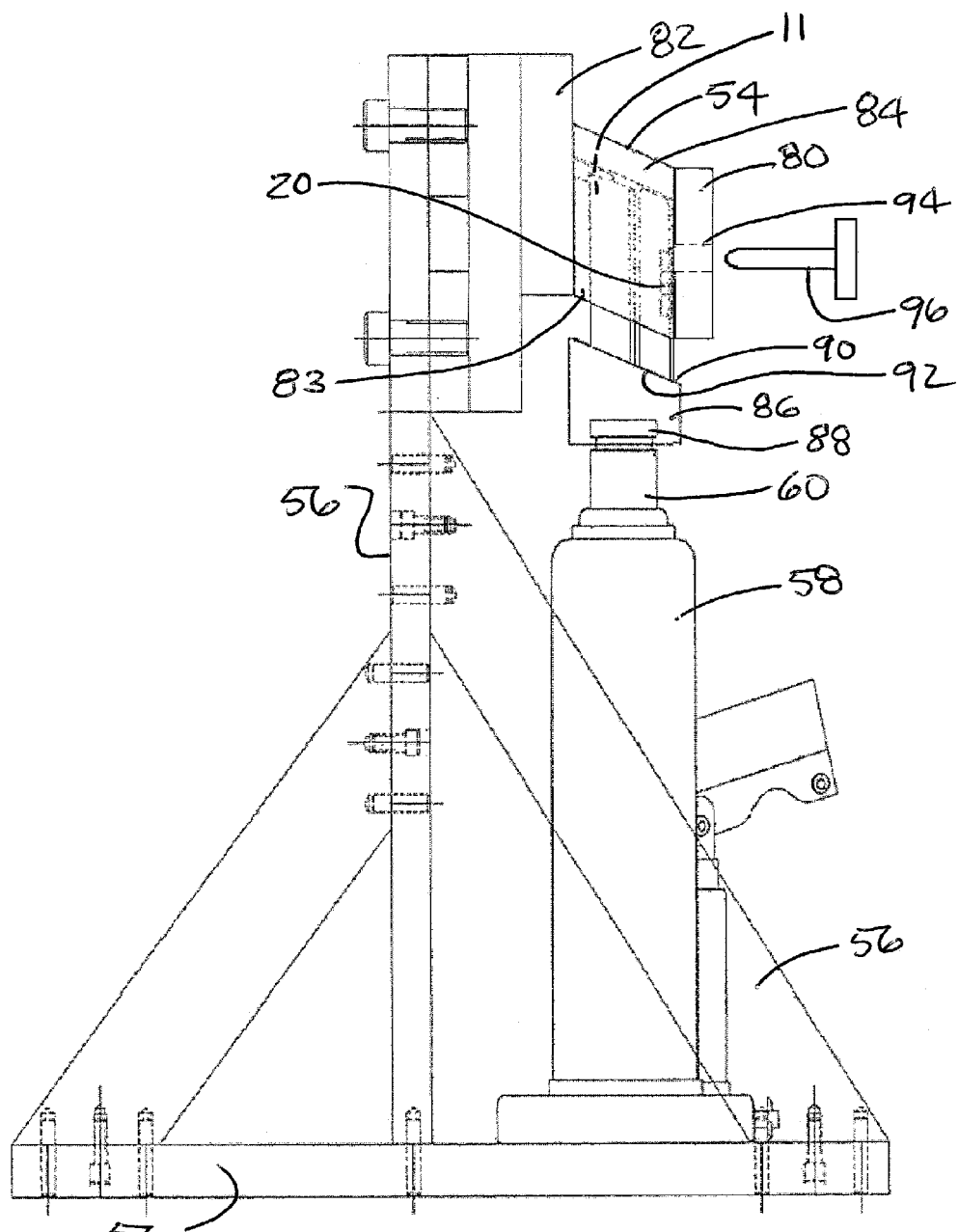
FIG. 3 is a side view of the apparatus of the present invention taken along line 3-3 of FIG. 2, with the piston block in a lowered position and the locking pin removed from the pinhole.
Figure 4:
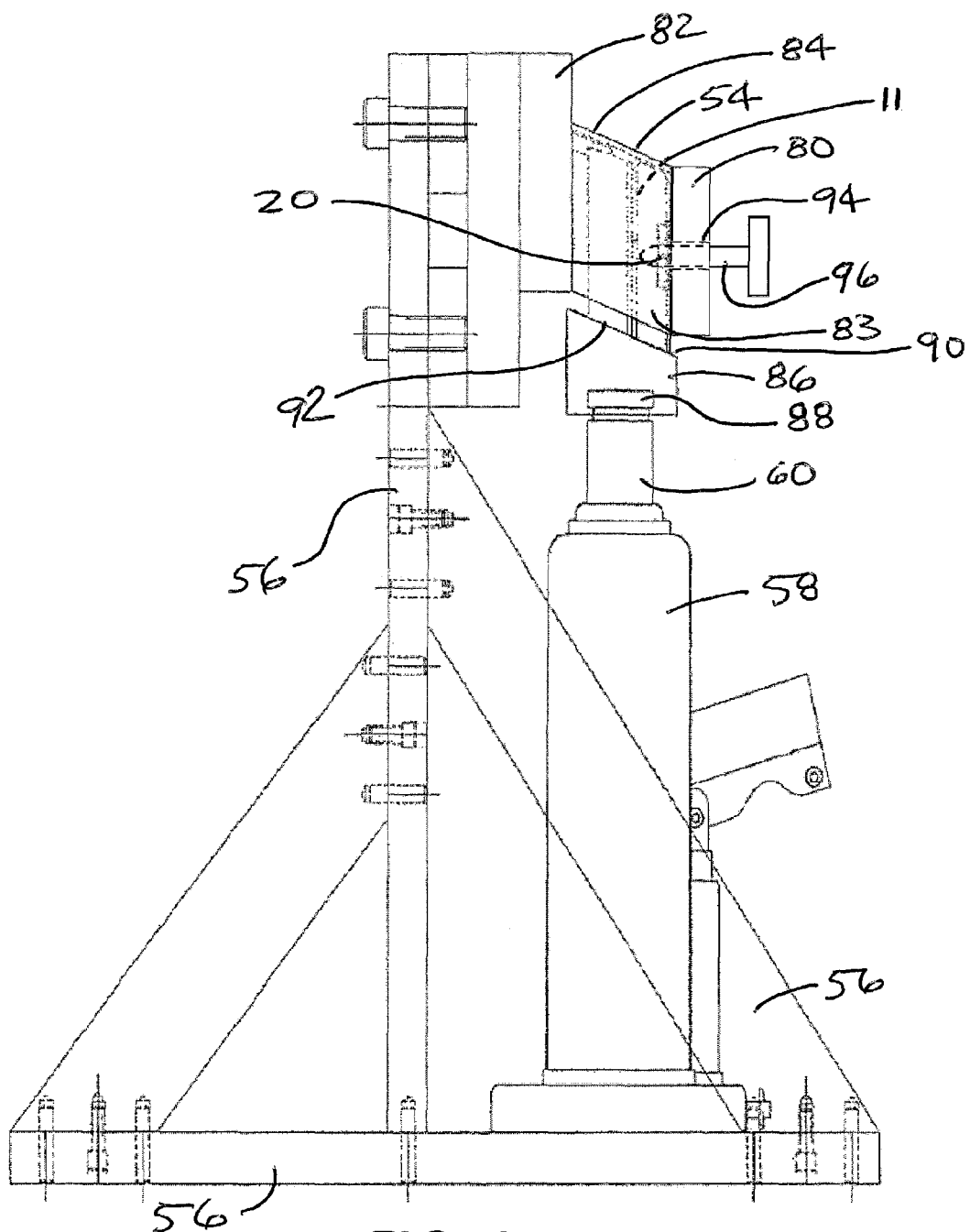
FIG. 4 is the view of FIG. 3, with the piston in a raised position and the locking pin extending through the pin hole and the bolt hole.

The apparatus 50 used to practice the method of the present invention is shown in FIGS. 2, 3 and 4. The apparatus 50 includes an outer shroud holding fixture 52 and an inner shroud holding fixture 54. The outer shroud holding fixture 52 is designed to receive and removably secure the forward rail 12 and aft ward rail 14 of the outer shroud 24 of the vane segment 11, while the inner shroud holding fixture 54 is designed to slideably receive the inner shroud 24 of the vane segment 11. The outer shroud holding fixture 52 and the inner shroud holding fixture 54 are secured to a base 56. A means for applying a force to the inner shroud of the vane segment 11, such as a mechanical or hydraulic press 58, is likewise secured to the base 56 directly below the inner shroud holding fixture 54. The press 58 has a piston 60 that can move along a first direction 61 relative to the outer shroud holding fixture 54.

The outer shroud holding fixture 52 is designed so as to (i) locate the inner shroud 16 directly in the path of the piston 60, and (ii) orient the inner shroud 16 so that when the piston 60 is driven into contact with the inner shroud 16, the inner shroud 16 is driven in a first direction 61 that is directly opposite the distortion direction 17. As shown in FIG. 2, the outer shroud holding fixture 52 includes a clamping plate 62 that slides on guide pins 64, 66 towards a base plate 68 into which the guide pins are secured, and a bottom plate 70 located immediately below the clamping plate 62 for supporting the outer vane shroud 24 of the vane segment 11 when a the method of the present invention is being practiced. A vise bolt 72, which extends through a hole 74 in the clamping plate 62, is threaded into a hole in the base plate 68 which receives the threaded vise bolt 72. The vise bolt 72 preferably has a vise handle 76 permanently attached to one end, to allow the vise bolt 72 to be rotated without the need for a separate tool. The threads of the vise bolt 72 and the threaded hole in the base plate 68 in which the vise bolt 72 is received are such that rotation of the vise handle 76 in a clockwise direction drives the clamping plate 62 towards the base plate 68. Preferably, the surface of the clamping plate 62 which faces the base plate 68, and the surface of the base plate 68 that faces the clamping plate 62, each includes contours which conform to either the forward rail 12 of the outer shroud 24, the aft ward rail 14 of the outer shroud 24, or both, so that when one or both rails 12, 14 are clamped into the outer shroud holding fixture 52, as described below, the force applied by the clamping plate 62 and the base plate 68 to the rails 12, 14 is distributed so as to avoid permanently distorting either of the rails 12, 14. When the contoured surface of the clamping plate 62 is close to, but in spaced relation to, the contoured surface of the base plate 68, the contoured surfaces cooperate to form grooves into which the forward rail 12, the aft ward rail 14, or both can easily slide so as to be positioned between the base plate 68 and the clamping plate 62. Once so positioned, the vise handle 76 can be rotated in a clockwise position, sliding the clamping plate 62 towards the base plate 68, until the forward rail 12, aft ward rail 14, or both, are clamped rigidly therebetween. In this manner, the outer shroud 24 of the vane segment 11 can be removably secured to the base 56 without damaging the vane segment 11. As shown in FIGS. 2-4, the inner shroud holding fixture 54 has a face plate 80 and a backing plate 82, which are connected by a spacing plate 84. The spacing plate 84 holds the facing plate 80 in spaced relation to the backing plate 82, providing a gap 83 therebetween which is sufficiently wide to slideably receive the inner shroud 16 of the vane segment 11 when the outer shroud 24 is removably secured to the base 56 as described above. A press block 86 is secured to the upper end 88 of the piston 60 immediately below the gap 83, and the upper surface 90 of the press block 86 is preferably contoured to be substantially flush with the lower surface 92 of the inner shroud 16 when the press block 86 is driven into contact with the inner shroud 16 by the piston 60, as described below. The face plate 80 includes a pin hole 94 extending therethrough at a predetermined location, that location being such that the pin hole 94 would be coaxial with the bolt hole 20 of the inner shroud flange 18 if the outer shroud 24 of a new vane segment 11 (which had not been run in an engine) were to be removably secured to the base 56 by the outer shroud holding fixture 52, as described above. A locking pin 96, long enough to be inserted into the pin hole 94 and extend through the bolt hole 20 when the pin hole 94 and bolt hole 20 are aligned, is included to be used as described below.

With respect to a vane segment 11 that has been run in an engine and for which it is desired to restore the inner shroud 16 thereof to its original design position and dimensions relative to the outer shroud 24 of such vane segment 11, the method of the present invention is practiced on the vane segment 11 as follows. The locking pin 96 is removed from the pin hole 94 and set aside, and the clamping plate 62 is positioned in spaced relation to the base plate 68 by rotating the vise handle 76 counterclockwise until the spaces between the contours of the clamping plate 62 and the base plate 68 are just wide enough to easily slide the forward rail 12, the aft ward rail 14, or both between the clamping plate 62 and the base plate 68, and rest the outer shroud 24 of the vane segment 11 on the bottom plate 70. The piston 60 is lowered so that the press block 86 is far enough below the inner shroud holding fixture 54 that it will not interfere with the effort to slide the forward rail 12, the aft rail, or both between the clamping plate 62 and the base plate 68, and rest the outer shroud 24 of the vane segment 11 on the bottom plate 70 during positioning of the vane segment 11 in the outer shroud holding fixture 52. The vane segment 11 is then heated by placing it in a furnace (preferably a gas furnace) and heating it to a temperature within the range of 1600° F. to 2050° F., and preferably within in the range of 1925° F. to 1975° F., so that the vane segment 11 is "red hot". The vane segment 11 is then taken out of the furnace, while red hot, and immediately the forward rail 12 and aft ward rail 14 of the outer shroud 24 are slid into the spaces between the contours of the clamping plate 62 and the base plate 68, and lowered until the outer shroud 24 of the vane segment 11 comes to rest on the bottom plate 70, and the inner shroud 16 is slideably received within the inner shroud holding fixture 54. Some wiggling of the vane segment 11 may be required while lowering the vane segment 11 to insure that it comes to rest on the bottom plate 70 rather than becoming hung up on the clamping plate 62 or the base plate 68. At this point, the vane segment 11 should still be red hot. The vane segment 11 is then secured to the base 56 by rotating the vise handle 76 clockwise until the forward rail 12, the aft ward rail 14, or both are rigidly clamped between the clamping plate 62 and the base plate 68 of the outer shroud holding fixture 52.

The press 58 is then operated to drive the piston 60 upward, until the contoured surface 90 of the piston block 86 comes into contact with the lower surface 92 of the inner shroud 16, and then the press 58 continues to be operated, driving the inner shroud 16 upward, until the bolt hole 20 in the inner shroud flange 18 is aligned with the pin hole 94. At this point, the locking pin 96 is inserted into the pin hole 94 and pushed through the bolt hole 20, fixing the position of the inner shroud 16 relative to the base 56. The vane segment 11 is then allowed to cool, preferably aided by fans, to ambient temperature, or at least until the vane segment 11 is cool enough that it can be handled by hand (i.e. cool enough to touch). The press 58 is then operated to lower the piston block 86 away from the inner shroud 16 of the vane segment 11. The vane segment 11 is then released from the outer shroud holding fixture 52 by rotating the vise handle 76 counterclockwise and sliding the clamping plate 62 away from the base plate 68 until the forward rail 12 and aft ward rail 14 are sitting loosely between the clamping plate 62 and the base plate 68. The locking pin 96 is then withdrawn from the bolt hole 20 and pin hole 94, and set aside. At this point, the vane segment 11 can be lifted by hand and slid upward and out of the outer shroud holding fixture 52 and the inner shroud holding fixture 54 altogether. As those skilled in the art will readily appreciate, this method needs to be performed while the vane segment 11 is subject to plastic deformation to prevent cracking of the vane segment 11, and so preferably, the time from when the vane segment 11 is removed from the furnace, until the time when the locking pin 96 is inserted into the pin hole 94 and the bolt hole 20, is not more than 20 seconds.

At this point, the bolt hole 20 is examined to determine whether the center 22 thereof has been displaced relative to the original equipment manufacturer's location (and the limits for that location). If the location of the bolt hole 20 has been displaced beyond those limits, the bolt hole 20 is drilled out to a pre-determined larger diameter hole, and then a cylindrical plug, having a diameter slightly smaller than that larger diameter, is brazed into the larger diameter hole. Preferably the plug is made of the same alloy as the inner shroud flange 18, but it may be made of other suitable alloys. The bolt hole 20 is then re-drilled through the brazed-in plug, such that the diameter of the bolt hole 20, and its center 22, fall within the respective limits of the original equipment manufacturer. If the plug is thicker than the inner shroud flange 18, the plug is machined down to match the original equipment manufacturer's dimensions for the inner shroud flange 18.

The present invention has been described in relation to particular embodiments, which are intended in all respects to be illustrative rather than restrictive. Alternative embodiments will become apparent to those of ordinary skill in the art to which the present invention pertains without departing from its scope. Substitutions may be made and equivalents employed herein without departing from the scope of the invention as recited in the claims. It will be understood that certain features and subcombinations are of utility and may be employed without reference to other features and subcombinations. This is contemplated and within the scope of the claims.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, what is claimed is:

1. A method of restoring dimensions of a vane segment, having an outer shroud, an inner shroud, and a plurality of airfoils extending therebetween, wherein said inner shroud has shifted in a distortion direction relative to said outer shroud due to operation in a gas turbine engine, said method comprising:
heating said vane segment to a temperature within a range of 1600° F. to 2050° F.;
rigidly clamping said heated vane segment such that said outer shroud of said vane segment is clamped to a first holding fixture secured to a base, thereby preventing movement between said outer shroud of said vane segment and said base;
driving said inner shroud away from said base in a direction that is opposite that of said distortion direction until said inner shroud reaches a predetermined distance from said base;
wherein said inner shroud includes a flange extending therefrom, said flange includes a bolt hole extending therethrough, and said predetermined distance is reached when said bolt hole is located coaxial with a pin hole in a face plate of an inner shroud holding fixture secured to said base;
allowing said vane segment to cool; and
releasing said outer shroud of said vane segment from said first holding fixture.

2. The method of claim 1, wherein said step of heating said vane segment to a temperature within said range of 1600° F. to 2050° F. comprises heating said vane segment to a temperature within a range of 1925° F. to 1975° F.

3. The method of claim 2, wherein said outer shroud includes a plurality of rails extending therefrom, and said step of rigidly clamping said outer shroud of said vane segment to said first holding fixture secured to said base comprises clamping at least one of said rails in said holding fixture.

4. The method of claim 3, wherein said step of allowing said vane segment to cool comprises allowing said vane segment to cool to ambient temperature.

5. The method of claim 4, wherein said step of releasing said outer shroud of said vane segment from said first holding fixture is followed by the steps of: drilling out said bolt hole to a pre-determined larger diameter hole; inserting a cylindrical plug into said larger diameter hole; brazing said plug into said larger diameter hole; and drilling a hole through said plug to replace said bolt hole.

6. The method of claim 1 further comprising removably clamping said inner shroud to a portion of said inner shroud holding fixture.

7. The method of claim 6, wherein removably clamping said inner shroud to said inner shroud holding fixture is accomplished by placing a locking pin through said bolt hole in said inner shroud and said pin hole in said face plate of said inner shroud holding fixture.

8. An apparatus for restoring dimensions of a vane segment having an outer shroud, an inner shroud, and a plurality of airfoils extending therebetween, wherein said inner shroud includes a flange extending therefrom and said flange includes a bolt hole, wherein said inner shroud has shifted in a distortion direction relative to said outer shroud due to operation in a gas turbine engine, said apparatus comprising:
a base;
an outer shroud holding fixture secured to said base;
an inner shroud holding fixture secured to said base; and
a press secured to said base below said inner shroud holding fixture;
wherein said inner shroud holding fixture includes a face plate having a in hole formed therein;
wherein said outer shroud holding fixture is designed to receive and removably secure said outer shroud of said vane segment, and said inner shroud holding fixture is designed to slideably receive said inner shroud of said vane segment;
wherein said press drives said inner shroud, coupled to said inner shroud holding fixture, in a direction opposite said distortion direction such that said inner shroud is located at a non-distorted position; and
wherein a locking pin cooperates with said pin hole of said face plate and said bolt hole of said inner shroud in order to retain said inner shroud at said non-distorted position.

9. The apparatus of claim 8 wherein said outer shroud holding fixture includes a clamping plate, a bottom plate located immediately below said clamping plate, a base plate, and guide pins secured to said base plate, wherein said clamping plate slides on said guide pins towards said base plate.

10. The apparatus of claim 9 wherein said outer shroud includes a plurality of rails extending therefrom, and said clamping plate includes a clamp surface which faces said base plate, said base plate includes a base surface that faces said clamping plate, and both said clamp surface and said base surface include contours which conform to at least one of said rails, so that when at least one of said rails is clamped into said outer shroud holding fixture, force applied by said clamping plate and said base plate to said at least one rail is distributed so as to avoid permanently distorting said at least one rail.

11. The apparatus of claim 10, wherein said inner shroud holding fixture includes a backing plate and a spacing plate that holds said face plate in spaced relation to said backing plate, thereby defining a gap therebetween which slideably receive said inner shroud of said vane segment when said at least one of said rails is clamped into said outer shroud holding fixture.

12. The apparatus of claim 11, wherein said press includes a piston and a press block that is secured to an upper end of said piston immediately below said gap, and the upper surface of said press block is contoured to be substantially flush with a lower surface of said inner shroud.

\* \* \* \* \*

UNITED STATES PATENT AND TRADEMARK OFFICE
CERTIFICATE OF CORRECTION

| | | |
|---|---|---|
| PATENT NO. | : 9,138,793 B2 | Page 1 of 1 |
| APPLICATION NO. | : 14/208489 | |
| DATED | : September 22, 2015 | |
| INVENTOR(S) | : Xuan Nguyen-Dinh et al. | |

It is certified that error appears in the above-identified patent and that said Letters Patent is hereby corrected as shown below:

IN THE CLAIMS

In Claim 8, col. 6, line 36 change the word "in" to --pin--.

Signed and Sealed this
Eighth Day of March, 2016

Michelle K. Lee
*Director of the United States Patent and Trademark Office*